US012624459B2

(12) United States Patent
Sevier

(10) Patent No.: US 12,624,459 B2
(45) Date of Patent: May 12, 2026

(54) METHOD OF CHEMICALLY CLEANING PIPEWORK SYSTEMS

(71) Applicant: David Sevier, Epsom (GB)

(72) Inventor: David Sevier, Epsom (GB)

( * ) Notice: Subject to any disclaimer, the term of this patent is extended or adjusted under 35 U.S.C. 154(b) by 551 days.

(21) Appl. No.: 18/000,572

(22) PCT Filed: Jun. 28, 2021

(86) PCT No.: PCT/EP2021/025238
§ 371 (c)(1),
(2) Date: Dec. 2, 2022

(87) PCT Pub. No.: WO2022/002440
PCT Pub. Date: Jan. 6, 2022

(65) Prior Publication Data

US 2023/0212758 A1 Jul. 6, 2023

(30) Foreign Application Priority Data

Jun. 28, 2020 (GB) ..................................... 2009844

(51) Int. Cl.
*B08B 9/00* (2006.01)
*C23G 1/06* (2006.01)
*C23G 1/36* (2006.01)
*C23G 3/04* (2006.01)
(Continued)

(52) U.S. Cl.
CPC ................ *C23G 1/061* (2013.01); *B08B 9/00* (2013.01); *C23G 1/36* (2013.01); *C23G 3/04* (2013.01); *F24D 19/0092* (2013.01); *F24H 9/455* (2022.01)

(58) Field of Classification Search
CPC . C23G 1/061; C23G 1/36; C23G 3/04; C23G 1/00; C23G 1/04; B08B 9/00; F24D 19/0092; F24H 9/455; F24H 9/45; F28G 9/00
See application file for complete search history.

(56) References Cited

U.S. PATENT DOCUMENTS 5,800,629 A 9/1998 Ludwig et al.
2012/0216834 A1 * 8/2012 Yang ...................... C11D 3/044
510/184

FOREIGN PATENT DOCUMENTS

CN 102373477 A 3/2012
CN 107937926 A 4/2018
CN 108409009 A * 8/2018
(Continued)

OTHER PUBLICATIONS

Machine translation of CN-108409009-A (Year: 2018).*
Machine translation of JP-2004277675-A (Year: 2004).*

*Primary Examiner* — Erin F Bergner
(74) *Attorney, Agent, or Firm* — Boyle Fredrickson, S.C.

(57) ABSTRACT

A process for chemical cleaning and corrosion inhibition of pipework, typically in closed loop systems, that avoids or significantly minimises the requirement for wastewater discharge where the system is first acidified using a mixture of cleaning agents capable of dissolving metal oxides. The method then precipitates any dissolved contaminants and separates the precipitate from the carrying fluid. Further elements of a combined corrosion inhibitor package are then added to any cleaning agent ions that remain in solution to develop a fully functional corrosion inhibition package to protect the metals of the system.

14 Claims, 1 Drawing Sheet

(51) Int. Cl.
*F24D 19/00* (2006.01)
*F24H 9/45* (2022.01)

(56) References Cited

FOREIGN PATENT DOCUMENTS

| | | | |
|---|---|---|---|
| CN | 110735143 | A | 1/2020 |
| GB | 2468211 | A | 9/2010 |
| JP | 2004277675 | A | 10/2004 |
| RO | 114911 | B1 | 8/1999 |
| WO | 2003092919 | A1 | 11/2003 |

* cited by examiner

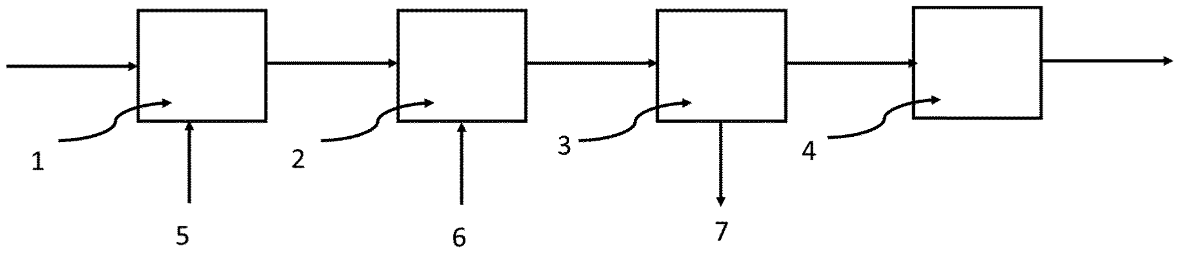
1
2
3
4
5
6
7

METHOD OF CHEMICALLY CLEANING PIPEWORK SYSTEMS

FIELD OF THE INVENTION

This invention relates to a method of chemically cleaning pipework systems, which may be either open or closed loop systems, and which avoids or significantly minimises the requirement for wastewater discharge. The pipework systems are typically systems that, in use, carry water-based fluids.

More specifically, the invention covers a process for chemical cleaning and corrosion inhibition of pipework, typically in closed loop systems, that avoids or significantly minimises the requirement for wastewater discharge where the system is first acidified using a mixture of cleaning agents capable of dissolving metal oxides. The method then precipitates any dissolved contaminants and separates the precipitate from the carrying fluid. Further elements of a combined corrosion inhibitor package are then added to any cleaning agent ions that remain in solution to develop a fully functional corrosion inhibition package to protect the metals of the system.

BACKGROUND

Chemical cleaning of pipework systems is necessary to remove debris and mill scales from metal and system services. This issue is most prevalent in closed loop systems where physical access to the inside surfaces of the pipes is more difficult. Such systems might include heated or chilled fluid systems, pipelines, heating or chilled systems, tank systems and such systems may be part of for example a ground source heating system.

When pipe and formed metal parts are made, the process can produce mill scales that chemical cleaning removes. Often the pipework can be oil or grease coated to a degree. Plastic pipe can be formed with sparingly soluble fatty acids in the plastic to help lubricate the pipework formation dies. There are all kinds of "other fouling elements" which might end up inside pipework. The pipes themselves can corrode. This can happen whether the system is wet or dry. Other fouling sources include, but is not limited to bark chips, stones, floating foam insulation, and parts of dead animals.

Failure to adequately clean pipework before bringing into service can result in reduced equipment performance, increased maintenance, and reduced equipment and system working life. Current practices for chemical cleaning a system involve adding a cleaning agent that dissolves/emulsifies or suspends metal oxides, debris, and other fouling elements. After the cleaning agent has finished its process of cleaning, it is then fully flushed out of the system with the system then being treated with a corrosion inhibitor package. Typically it requires a water volume of ten times or greater that of the system total volume to fully flush out the cleaning agent so that the system water conductivity is no more than ten percent greater or ten percent less than that of the conductivity values of the water being used to fill the closed loop. Few cleaning agents are compatible or helpful to the final corrosion inhibitor packages that are later used to preserve the system. Most cleaning agents and dissolved metal ions such as iron and copper have strongly negative impacts on the corrosion inhibitor package performance. Traces of cleaning agents can increase system corrosion rates ten times or more. Corrosion inhibitor packages for aluminium are very adversely affected by the presence of copper ions. Excessive iron levels can lead to iron bound hardness scale formation on hot heat transfer surfaces which adversely impact heat transfer. Many other adverse impacts of failing to fully remove cleaning agents and/or not producing low iron and copper water at the end of a pipework clean are well documented and widely known to those involved in chemical cleaning and maintenance of water systems. It is therefore important that the cleaning agent and the released contaminants are fully removed before adding corrosion inhibitors to a closed loop system.

The volume of water supply required to fully flush closed loop systems following chemical cleaning and the requirement to treat the produced effluent has negative environmental and financial impacts. Dissolved copper and zinc levels can rise to values of over 100 ppm during chemical cleaning under acidic conditions. Typical discharge permits within Britain require that copper discharge be limited to a maximum of 3 ppm. The issue of treating effluent contaminated with dissolved metal ions such as copper and zinc is non-trivial. Increasing attention is being paid to ensure that conditions of issued discharge permits are adhered to. Increased awareness of the costs associated with water supply and the cleaning up of discharge water has created a desire to find a way to clean closed loop systems that either reduces or eliminates the large volume of water required and the associated discharge.

Efforts have been made to try to eliminate the use of cleaning agents associated with chemical cleaning of closed loop systems. GB2468211A describes a method that seeks to deliver only water to the closed loop system that has been treated with corrosion inhibitors and biocide and then relies upon filtration down to fine particle sizes to eliminate debris from the system. The described method relies solely on the effect of moving water to remove debris and metal oxides from within the system and from the metal surfaces. It does not address the difficulty of removing tightly adhering metal oxides attached to metal surfaces and is incapable of removing metal ions that are dissolved within the system water. For this reason, the described method can only be used on clean new systems and never on systems that contain rusts or metal oxides. Furthermore, GB2468211A is concerned only with the removal of bacteria and does not consider the problem of removing other contaminants or metal oxides.

It is desirable to achieve a useful cleaning method for closed loop systems without discharge or with only small discharge that has wide applicability. Metal oxides need to be stripped from metal surfaces and the released soluble and insoluble contaminants removed from the carrying water.

According to the present invention, there is provided a method of chemically cleaning pipework systems, the method comprising the following steps:

A) cleaning the metal surfaces using a water-based cleaning fluid that includes a source of one or more of the following: phosphate ions, metaphosphate ions, polyphosphate ions, or pyrophosphate ions;

B) raising the pH using an alkali metal salt hydroxide/oxide/carbonate to cause precipitation of soluble metal ions;

C) separating insoluble minerals and suspended debris from the carrying fluid debris by passing at least a part of the cleaning fluid through at least one filter or separator; and D) adding chemical compounds and/or elements to the dissolved ions that remain in the filtered cleaning fluid to assemble a corrosion inhibitor package to protect the closed loop system from corrosion.

The cleaning fluid may or may not be acidic.

The source of phosphate ions may be either phosphoric acid or a phosphate salt. Pyrophosphate, polyphosphate and metaphosphate can be supplied from salts such as sodium pyrophosphate or sodium polyphosphate or sodium hexametaphosphate.

Step C includes passing at least a part of the cleaning fluid through at least one filter.

The method may comprise, prior to step B, removing at least part of the cleaning fluid from the pipe work system to pass the cleaning fluid through a filter.

The method may comprise a further step of returning the filtered fluid back to the pipework system after step C.

The alkali metal salt used may be either calcium or magnesium oxide/hydroxide/carbonate.

The alkali metal salt used may be either calcium or magnesium oxide/hydroxide/carbonate and a soluble source of alkali ions.

The alkali ions may be added in a separate step to the calcium or magnesium oxide/hydroxide/carbonate.

The alkali metal salt used may be either calcium or magnesium oxide/hydroxide/carbonate and calcium or alkali metal oxide/hydroxide/carbonate.

Step B involves raising the pH of the fluid so that the solubility of the formed alkali metal salt and other dissolved ions fall and come out of solution as precipitates that can later be separated out. This begins to occur at acidic pH values, but typically low levels of dissolved metal ions are achieved by raising the pH value to above 7, above 8, above 8.5 or even above 10.

The method may further comprise the step of introducing an acid into the cleaning fluid to reduce the pH prior to returning the cleaning fluid into the pipework system.

The method further comprises a step of adding further ingredients to assemble a corrosion inhibitor package to protect the closed loop system from corrosion. The assembled corrosion inhibitor package will take into account ions such as phosphates and polymers that will remain in solution at the end of the cleaning process. The final corrosion inhibitor additive package may comprise other ions and compounds including one or more of sodium molybdate, cerium nitrate, sodium nitrite and triethanolamine. The assembly and addition of the final corrosion inhibitor package to the system fluid will typically take place after the cleaning of the system pipework is complete and the fluid filling the system has successfully had the released debris, oils/greases, dissolved metal oxides and other contaminants removed.

Step A may include recirculating the cleaning fluid within the pipework system.

The method may further comprise, in either steps A or step B, introducing a flocculating agent into the pipework system or to the fluid flow to cause larger particles of precipitate to form which are then easier to separate.

LIST OF FIGURES

The invention will now be described with reference to FIG. 1, which shows a schematic representation of one example of the method of the present invention.

SPECIFIC DESCRIPTION

The invention described within this application directly addresses the issue of metal oxide removal and dissolved metal ions released during system cleaning while avoiding or greatly reducing discharge. The described method can remove, amongst other things, unwanted rusts, zinc oxides and copper oxides from metal surfaces.

Phosphoric acid is widely used in corrosion and cleaning mixtures. Phosphoric acid forms highly insoluble compounds with many metal ions under near neutral, neutral or alkali pH conditions. Calcium and magnesium carbonates, oxides and, hydroxides all have very low solubility under neutral or alkali conditions. If these chemicals are used to raise the pH of the solution water, the low solubility of the starting ingredients (calcium and magnesium carbonates, oxides and, hydroxides) avoids an excessive build-up of calcium or magnesium ions in the solution. This makes designing the final corrosion inhibitor package easier. Similar solubility characteristics are true of metal ion salts of metaphosphate and pyrophosphate.

Some of the reactions of calcium hydroxide with phosphoric acid are:

Reaction 1: $Ca(OH)_2+2H_3PO_4 \rightarrow Ca(H_2PO_4)_2+2H_2O$ Calcium dihydrate formation reaction Reaction 2: $Ca(H_2PO_4)_2+Ca(OH)_2 \rightarrow 2CaHPO_4 \cdot 2H_2O$ Brushite formation reaction Reaction 3: $3Ca(OH)_2+2H_3PO_4\ 4 \rightarrow Ca_3(PO_4)_2+6H_2O$ Tricalcium phosphate formation reaction The solubility of calcium phosphates fall as they become more neutralised with calcium hydroxide. Calcium dihydrate has a solubility of 20 g/l. Brushite has a solubility of 0.2 g/l. Tricalcium phosphate has a solubility of 0.02 g/l. In general, the higher the pH, the lower the solubility of calcium or magnesium phosphates.

Similar reaction cascades exist for the reaction of calcium oxide or calcium carbonate with phosphoric acid. Similar is true for the reaction of magnesium oxide/hydroxide/carbonate with phosphoric acid.

Some of the reactions of iron and copper oxides with phosphoric acid are:

Reaction 4: $3FeO+2H_3PO_4+5H_2O \rightarrow Fe_3(PO_4)_2 \cdot 8H_2O$

Reaction 5: $2H_2O+3Fe(OH)_2+2H_3PO_4 \rightarrow Fe_3(PO_4)_2 \cdot 8H_2O$

Reaction 6: $8\ H_3PO_4+3Fe_3O_4 \rightarrow 6FePO_4+Fe_3(PO_4)_2+12H_2O$

Reaction 7: $3CuO+2H_3PO_4 \rightarrow Cu_3(PO_4)_2 \cdot 3H_2O$

It is possible to dissolve acidic phosphate salts such as brushite in water to create a degree of "free" phosphoric acid ions in the dissolved solution that could be used as a phosphoric acid ion source for the described process of this patent. The invention therefore also covers the use of acidic phosphate salts as a phosphoric ion source as a variation of the process. For simplicity, the rest of the patent discussion refers to phosphoric acid but is intended to cover the possible use of acidic phosphate salts as well. The invention is equally useful with any source of phosphate ions, which most conveniently can be found in either acidic phosphate salts or phosphoric acid. The invention will also work with any source of metaphosphate ions, polyphosphate ions, or pyrophosphate ions such as sodium hexametaphosphate, sodium tripolyphosphate, or sodium pyrophosphate. Use of alkali phosphate, pyrophosphate and metaphosphate salts is possible if mixed with phosphoric acid or acidic phosphate salts to reduce the pH.

Copper, zinc, and iron phosphates are soluble under acidic conditions with solubility rising as the pH falls. The solubility of iron, zinc, and copper phosphates, pyrophosphate and metaphosphates under near neutral and basic conditions is very low. This chemistry allows ions such as copper, zinc, and iron oxides to be first removed from pipework and metal surfaces under acidic conditions by dissolution and then for the dissolved metal ions to be precipitated and removed from the cleaning fluid. If calcium hydroxide, calcium carbonate or calcium oxide are used to raise the pH of the cleaning solution, insoluble reactants will be formed with excess phosphoric acid to create insoluble calcium phosphates which can also be removed from the cleaning solution. Similar chemistries exist with magnesium oxide, magnesium carbonate and magnesium hydroxide; barium oxide, barium carbonate and barium hydroxide; manganese oxide, manganese carbonate and manganese hydroxide; strontium oxide, strontium carbonate and strontium hydroxide. The formed insoluble particles also act as useful seed crystallization points that further absorb other contaminant phosphates as the crystal structure grows. This usefully helps create a final particle distribution that is shifted to larger sized particles compared to the situation where a soluble alkali source such as sodium hydroxide is used. Larger particles are easier to separate from fluid than smaller particles.

The conditions created during the cleaning stage of the process will cause contaminating oils and greases to be freed into the passing fluid flow. The process of causing numerous particles to form as the pH rises is further useful in that the formed particles create a large surface area to which contaminating oils and greases are absorbed. The particles and the absorbed oils/greases are then removed from the system during the filtration process. This process creates a route by which contaminating oils and greases are effectively stripped from the system.

As a rule, the solubilities of metal ions such as iron and copper continue to fall as the pH of the solution rises above neutral. Therefore it can be useful to raise the fluid pH above the range of optimal long term corrosion control to reduce dissolved metal ion load and then to reduce the pH of the fluid prior to or during the final assembly of the long term corrosion inhibition package. For example, iron levels can be reduced to values under 1 ppm if the fluid pH is increased to 8.5 and above. The fluid pH is then reduced if corrosion protection of aluminium is required.

The described invention is as follows:

An acidic cleaning agent mixture that contains any of the following ions: phosphate ions, pyrophosphate ions, polyphosphate ions, metaphosphate ions which is introduced to an aqueous solution and circulated within a closed loop system. The cleaning solution then dissolves and suspends debris and metal oxides. All or a portion of the cleaning solution is mixed with an alkali metal oxide/hydroxide/carbonate. By alkali metal, it is meant any of the Group I or Group II metals from the periodic table. In theory, any could be used, although potassium, calcium, sodium, strontium, magnesium, and barium are preferred. The other elements in Group I or Group II from the periodic table are either poisonous (beryllium) or overly expensive (lithium) or rare (such as rubidium) or radioactive (radium). The addition of the alkali metal oxide/hydroxide/carbonate causes the pH to rise and insoluble phosphorus compounds to come out of solution. This removes metal ions such as iron, copper and zinc that were dissolved during the initial cleaning process. The created insoluble compounds are separated out and the cleaned-up fluid returned to the system. Whilst any separation and/or filtration of the cleaning solution to remove precipitates is likely to be easiest if the cleaning fluid is passed out of the pipework system into a separate separation and/or filtration loop prior to being returned to the pipework system, it is conceivable that appropriate separation and/or filtration elements could be introduced into the pipework system, such that separation and/or filtration be carried out within the pipework. The cleaning solution is circulated through the pH adjustment and precipitation sections where dissolved metal ions are precipitated out until all the system water is free of unwanted metal ions such as iron, copper, zinc and any other released debris. The system water then has added to it components (as described in later examples) that can convert the remaining ions in solution to a corrosion inhibitor to protect the system metals.

The general principals of the described cleaning and corrosion method are:

1) Clean using a water based acidic cleaner that includes any of the following: phosphate, pyrophosphate, polyphosphate, and metaphosphate ions.
2) All components within the cleaning agent preferably represent ions that are used within corrosion inhibitors. Examples of such ions are azoles, phosphonates, and polymers. This allows the same fluid to be used to assemble a corrosion inhibition package as mentioned below.
3) When the cleaning phase is complete, a flow of the system fluid is taken, and the pH is raised using an alkali metal oxide/hydroxide/carbonate.
4) The resulting precipitate is separated, and the cleaned-up fluid is returned to the bulk of the cleaning fluid. This is repeated until the entirety of the system fluid is free from unwanted metal ions and debris.
5) Other ions required to assemble a corrosion inhibition package are then added to the system water.

This method can be further improved using calcium or magnesium oxide/hydroxide/carbonates in step three to control build-up of the added alkali metal oxide/hydroxide/carbonate within the closed loop fluids. Calcium or magnesium hydroxides and carbonates are increasingly insoluble under near neutral, neutral and alkali conditions.

The use of a mixed single stage or two-stage addition system of a calcium or magnesium alkali source mixed with or followed by addition of a soluble alkali such as sodium or potassium hydroxide can be useful in some circumstances.

There can be an advantage in excessively raising the pH in step 3 into the alkali range to aid in the precipitation of certain target contaminants such as iron followed by then reducing the pH with acid addition using an acid such as phosphoric acid. Several contaminants such as iron phosphate have further reduced solubility as pH is raised in the alkali range. Increasing pH of the fluid into the region of pH 8 or greater can result in very low levels of dissolved iron in the surrounding fluid. The solids are then separated from the fluid. The pH level is then reduced to the desired pH range by acid addition before returning to the main closed loop system.

The raising of the pH level causes insoluble minerals to come out of solution which are then separated by passing through a separator or separators where the majority of the settleable solids are removed and collected. There are several well-recognised methods to remove insoluble solids from liquid masses such as centrifugation or use of clarifiers. Centrifugal based separation and clarifier technology is well defined and widely used in industry. The described method will work with a variety of separation techniques and is not limited by a specific separation method.

Further polishing of the fluid is achieved by passing through fine particle filters.

A diagram of the suggested configuration is shown in FIG. 1 where 1 is a tank or pipe section where an alkali metal oxide/hydroxide/carbonate shown as 5 is mixed with a flow of the fluid from the closed loop system to raise the pH of the system fluid. This is carried out after the addition of the cleaning fluid.

The cleaning step itself, i.e. the circulation of the cleaning fluid within the system to dissolve the contaminants, may take several days to complete. The time for the cleaning reaction to complete is temperature and fluid flow dependent. Normally it takes a few days for the cleaning to usefully occur but if temperature is increased, the cleaning rate also increases. Typically, as a broad assumption, for every 10 degrees of temperature rise, the reaction rate doubles. During the cleaning phase of the process, the cleaning fluid would typically be continuously circulated to generate faster and better cleaning. Typical cleaning times would be 1 to 4 days of cleaning time.

Precipitation of solids occurs in the first stage (1) shown in FIG. 1 from the reaction of the alkali metal oxide/hydroxide/carbonate (5) that is introduced into this section. The fluid and solids then pass to section 2 where further pH adjustment takes place with an alkali source shown as 6 is mixed with the fluids in section 2 to bring the pH of the water to a pH nearer to or equal to the required solubility minimum for phosphate and phosphorus minerals. Typically, this is at or near pH 7. Further precipitation of contaminants takes place to further increase the amount of precipitate present within the carrying fluid. It is possible to optionally combine sections 1 and 2 into one section if desired and to directly raise the pH in a single step. This can be done with a single alkali metal oxide/carbonate/hydroxide or can be done with a combination of alkali metal oxides/carbonates/hydroxides. The fluids and solids then pass to section 3 where the bulk of the solids are separated from the fluid phase using a solids separation process. This could be done using a clarifier to enable the settling and separation of precipitated solids from fluids. Alternatively, this could be achieved using centrifugation. Other solids separation methods are also possible. The solids flow is shown as 7 leaving from section 3 in FIG. 1. The cleaned-up fluids created by the solids separation method in section 3 will contain low levels of suspended solids. This fluid is then passed to section 4 where the fluid passes through final polishing filters to remove finer sized particles from the fluid flow. The fluid flow which has had the dissolved contaminants removed by the described process is then passed back to the system. The described treatment process can be run as either a batch process or as a continuous process.

A useful variation to the described method is to introduce a flocculating agent either within section 3 or in section 2 or in the piping between sections 2 and 3. Flocculants are widely used to improve the effectiveness of clarifier operation due to their ability to create easier to separate larger particles from many smaller particles.

Variations to the described method will be obvious to those who are skilled in this work.

Examples of embodiments of the described process are:

Example One

An acidic cleaning solution containing phosphoric acid, nitric acid, a short chain polyacrylate polymer, an azole such as benzotriazole and boric acid is introduced to the fluid within the closed loop system. The fluid mixture is circulated repeatedly through the closed loop system until the mixture has successfully cleaned the system. After this, the pH of a portion of the system water is raised using a mixture of calcium hydroxide and sodium hydroxide as alkali sources and then dissolved metal ions precipitated as insoluble phosphates. The formed precipitate is removed, and the fluid returned to the main system. This is done until all the system water is free of debris and unwanted metal ions and, the pH of the system rises to above seven. The system water then has added to it other components of the corrosion inhibitor system such as sodium molybdate or triethanolamine to create a working corrosion inhibition package.

Further variations are to use either calcium oxide or calcium carbonate instead of calcium hydroxide. Sodium or potassium carbonates can be used instead of sodium hydroxide. Other alkalis can also be substituted as the alkali source if this does not interfere with the final corrosion inhibitor system that is assembled.

Example Two

An acidic cleaning solution containing phosphoric acid, nitric acid, a short chain styrene type polymer, an azole such as benzotriazole and boric acid is introduced to the fluid within the closed loop system. The fluid mixture is circulated repeatedly through the closed loop system until the mixture has successfully cleaned the system. After this, the pH of a portion of the system water is raised using a mixture of magnesium hydroxide and sodium hydroxide as alkali sources and then dissolved metal ions precipitated as insoluble phosphates. The formed precipitate is removed, and the fluid returned to the main system. This is done until all the system water is free of unwanted metal ions and the pH of the system rises to above seven. The system water then has added to it other components of the corrosion inhibitor system such as sodium molybdate or triethanolamine to create a working corrosion inhibition package.

Further variations are to use either magnesium oxide or magnesium carbonate instead of magnesium hydroxide. Sodium or potassium carbonates can be used instead of sodium hydroxide. Other alkalis can also be substituted as the alkali source if this does not interfere with the final corrosion inhibitor system that is assembled.

Example Three

An acidic cleaning solution containing phosphoric acid, nitric acid, a short chain polymer, an azole such as benzotriazole and boric acid is introduced to the fluid within the closed loop system. The fluid mixture is circulated repeatedly through the closed loop system until the mixture has successfully cleaned the system. After this, the pH of the system water is raised using a sodium or potassium hydroxide as alkali sources and then dissolved metal ions are precipitated as insoluble phosphates. The formed precipitate is removed, and the fluid returned to the main system. This is done until all the system water is free of unwanted metal ions and the pH of the system rises to above seven. The system water then has added to it other components of the corrosion inhibitor system such as sodium molybdate, sodium nitrite and triethanolamine to create a working corrosion inhibition package.

Sodium or potassium carbonates can be used instead of sodium hydroxide. Other alkalis can also be substituted as the alkali source if this does not interfere with the final corrosion inhibitor system that is assembled.

In this example, due to the presence of nitrite in the final corrosion inhibition package, the produced system fluid cannot be reconverted to a cleaner if required due to the presence of nitrite ions which decompose under acid conditions to release nitrogen oxides that are toxic. Nitrite is one of the world's most widely used corrosion inhibitors. This embodiment is to demonstrate the ability to use nitrite as part of the final corrosion inhibitor package using the processes outlined in this application. Fluids that contain nitrite ions would need to either remove the nitrite ions or convert the nitrite ions to nitrate before using the described cleaning processes within this patent application.

Example Four

An acidic cleaning solution containing phosphoric acid, nitric acid, a short chain polymer, an azole such as benzotriazole and boric acid is introduced to the fluid within the closed loop system. The fluid mixture is circulated repeatedly through the closed loop system until the mixture has successfully cleaned the system. After this, the pH of a portion of the system water is raised using a calcium or magnesium hydroxide as alkali sources and then dissolved metal ions precipitated as insoluble phosphates. The formed precipitate is removed, and the fluid returned to the main system. This is done until all the system water is free of unwanted metal ions and the pH of the system rises to above seven. The system water then has added to it other components of the corrosion inhibitor system such as sodium molybdate or triethanolamine to create a working corrosion inhibition package.

Further variations are to use either calcium oxide or calcium carbonate instead of calcium hydroxide. Magnesium oxide or magnesium carbonate can also be used instead of magnesium hydroxide.

Example Five

A useful variation of the described process is to first treat the closed loop system water with a corrosion inhibitor package based on phosphates and/or pyrophosphates and/or metaphosphates and/or polyphosphates, nitrates, polymers, azoles, and borates to prevent corrosion during the commissioning and testing phases. The system is then acidified with phosphoric acid to produce an acidic cleaning mixture. After the mixture has successfully cleaned the closed loop system, the pH of a portion of the system water is raised using either calcium hydroxide or a mixture of calcium hydroxide and sodium hydroxide as alkali sources and then dissolved metal ions are precipitated as insoluble phosphates. The formed precipitate is removed, and the fluid returned to the main system. This is done until all the system water is free of unwanted metal ions and the pH of the system rises to above seven. The system water then has added to it other components of the corrosion inhibitor system to create a working corrosion inhibition package that does not include nitrite.

This variation leaves open the possibility of further cleaning being undertaken if insufficient cleaning of the pipework has been carried out, or sections of uncleaned pipework are connected to the cleaned system or, cleaning being required years in the future due to corrosion products building up. In this variation, further cleaning is possible by acidifying the system fluid with phosphoric acid and other cleaning agents and repeating the cleaning and precipitation process to produce a clean system filled with fluid that can then be converted back into a corrosion inhibitor as per the previously outlined methods.

Example Six

Another example of the process is to first treat the closed loop system water with a corrosion inhibitor package based on phosphates and/or pyrophosphates and/or metaphosphates and/or polyphosphates, nitrates, polymers, azoles, and borates to prevent corrosion during the commissioning and testing phases. The system is then acidified with phosphoric acid or an acidic phosphate salt such as brushite to produce an acidic cleaning mixture. After the mixture has successfully cleaned the closed loop system, the pH of a portion of the system water is raised using calcium hydroxide/carbonate/oxide as alkali sources and then dissolved metal ions precipitated as insoluble phosphates. A flocculating agent is then introduced to aid the creation of larger particles that are easier to separate with a clarifier. The formed precipitate is removed, and the fluid returned to the main system. This is done until all the system water is free of unwanted metal ions and the pH of the system rises to above seven. The system water then has added to it other components of the corrosion inhibitor system to create a working corrosion inhibition package.

Example Seven

An acidic cleaning solution containing phosphoric acid, nitric acid, a short chain styrene type polymer, an azole such as benzotriazole and boric acid is introduced to the fluid within the closed loop system. The fluid mixture is circulated through the closed loop system until the mixture has successfully cleaned the system. After this the pH of a portion of the system water is raised to an alkali pH value using a mixture of calcium or magnesium hydroxide/oxide and then dissolved metal ions precipitated as insoluble phosphates. The formed precipitate is removed, and the fluid then has added sufficient phosphoric acid to reduce the pH of the fluid to 7 to 7.5 and is then returned to the main system. This is done until all the system water is free of unwanted metal ions and the pH of the system fluids rises to above seven. The system water then has added to it other components of the corrosion inhibitor system such as sodium molybdate, sodium nitrite, cerium nitrate, and triethanolamine to create a working corrosion inhibition package.

There will be multiple variations to the cleaning chemical and corrosion inhibitor packages and processes described that will be apparent to those who have skills in these areas.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method of chemically cleaning pipework systems that comprises the following steps in order:

A) cleaning the metal surfaces using a water-based acidic cleaning fluid that includes a source of one or more of the following ions: phosphate, pyrophosphate, metaphosphate, polyphosphate to produce dissolved metal ions;

B) raising the pH using an alkali metal salt hydroxide/oxide/carbonate to cause precipitation of the dissolved metal ions;

C) separating insoluble minerals and suspended debris by passing at least a part of the cleaning fluid through at least one filter or separator to produce filtered cleaning fluid, wherein the filtered cleaning fluid contains non-metal dissolved ions;

D) adding chemical compounds and/or elements to the non-metal dissolved ions that remain in the filtered cleaning fluid to assemble a corrosion inhibitor package to protect the metal surfaces from corrosion; and E) retaining the filtered cleaning fluid and corrosion inhibitor package in the pipework system as a heat transfer fluid.

2. A method according to claim 1, wherein the source of phosphate ions is either phosphoric acid or a phosphate salt, and the source of pyrophosphate ions is a pyrophosphate salt, and the source of metaphosphate ions is a metaphosphate salt, and the source of polyphosphate is polyphosphate salt.

3. A method according to claim 1, wherein the filtration or separation is carried out after the pH has been raised.

4. A method according to claim 1, which includes, prior to raising the pH, removing at least part of the cleaning fluid from the pipe work system in order to pass the cleaning fluid through at least one filter or separator in step (C).

5. A method according to claim 4, further comprising the step of returning the filtered cleaning fluid back to the pipework system.

6. A method according to claim 1, wherein the alkali metal salt used is either calcium or magnesium oxide/hydroxide/carbonate.

7. A method according to any of claim 1, wherein the alkali metal salt used includes one or more of the following compounds: calcium oxide, calcium hydroxide, calcium carbonate, magnesium oxide, magnesium carbonate, magnesium hydroxide, barium oxide, barium carbonate, barium hydroxide, manganese oxide, manganese carbonate, manganese hydroxide, strontium oxide, strontium carbonate, sodium and potassium oxides, hydroxides and carbonates and strontium hydroxide.

8. A method according to claim 7, wherein the alkali metal salt is added in a separate step to the calcium or magnesium oxide/hydroxide/carbonate.

9. A method according to claim 1, wherein step B of claim 1 raises the pH to above 7.

10. A method according to claim 1, which includes, prior to reducing the pH, removing at least part of the cleaning fluid through at least one filter or separator in step (C), further comprising the step of returning the filtered cleaning fluid back to the pipework system and further comprising a step of introducing an acid into the cleaning fluid to reduce the pH prior to returning the cleaning fluid into the pipework system.

11. A method according to claim 1, wherein the corrosion inhibitor package includes one or more of the following: molybdate, nitrite, nitrate, cerium, azole, polymer and triethanolamine.

12. A method according to claim 1, wherein the filtered cleaning fluid is first returned to the system prior to the addition of the chemical compounds and/or elements to assemble the corrosion inhibitor package.

13. A method according to claim 1, wherein step A of claim 1 includes recirculating the cleaning fluid within the pipework system.

14. A method according to claim 1, further comprising, in either step A or step B of claim 1, introducing a flocculating agent into the pipework system or to the fluid being passed to filters or other separators to cause larger particles of precipitate to form.

* * * * *